US008630270B2

(12) United States Patent
Zhang et al.

(10) Patent No.: US 8,630,270 B2
(45) Date of Patent: Jan. 14, 2014

(54) MAC MULTIPLEXING FOR UPLINK MIMO

(75) Inventors: Guodong Zhang, Syosset, NY (US); Stephen E. Terry, Northport, NY (US); Sung-Hyuk Shin, Northvale, NJ (US); Mohammed Sammour, Alrabieh (JO); Jin Wang, Central Islip, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 1096 days.

(21) Appl. No.: 12/493,482

(22) Filed: Jun. 29, 2009

(65) Prior Publication Data

US 2009/0323842 A1 Dec. 31, 2009

Related U.S. Application Data

(60) Provisional application No. 61/076,740, filed on Jun. 30, 2008.

(51) Int. Cl.
*H04J 3/00* (2006.01)
(52) U.S. Cl.
USPC .......................................................... 370/337
(58) Field of Classification Search
USPC ................... 370/310–350, 431–463
See application file for complete search history.

(56) References Cited

U.S. PATENT DOCUMENTS

| | | | |
|---|---|---|---|
| 2005/0160181 A1* | 7/2005 | Kwon et al. ................... | 709/238 |
| 2006/0251175 A1* | 11/2006 | Reznik et al. ............ | 375/240.24 |
| 2007/0053383 A1* | 3/2007 | Choi et al. ..................... | 370/469 |
| 2007/0189235 A1* | 8/2007 | Chandra et al. ............... | 370/335 |

FOREIGN PATENT DOCUMENTS

EP 1351414 A2 10/2003

OTHER PUBLICATIONS

Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.1.0, (Mar. 2008).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.2.0, (May 2008).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.6.0, (Jun. 2009).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0, (Mar. 2008).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.5.0, (May 2008).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.9.0, (Jun. 2009).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 9)", 3GPP TS 36.300, V9.0.0, (Jun. 2009).

* cited by examiner

*Primary Examiner* — Fan Ng
(74) *Attorney, Agent, or Firm* — Condo Roccia LLP

(57) ABSTRACT

A method and apparatus for logical channel prioritization in a wireless transmit receive unit (WTRU), including the WTRU receiving multiple streams of a multiple input/multiple output (MIMO) signal, a physical layer (PHY) of the WTRU providing an indicator for each of the multiple streams to a medium access control (MAC) layer of the WTRU, and the MAC layer performing logical channel multiplexing based on the indicator for each of the multiple streams.

22 Claims, 5 Drawing Sheets

MAC MULTIPLEXING FOR UPLINK MIMO

CROSS REFERENCE TO RELATED APPLICATIONS

This application claims the benefit of U.S. Provisional Application No. 61/076,740, filed on Jun. 30, 2008 which is incorporated by reference as if fully set forth.

FIELD OF INVENTION

This application is related to wireless communications.

BACKGROUND

The long term evolution-advanced (LTE-A) project of the third generation partnership Project (3GPP) is working towards enhancements of the LTE program. For example, the LTE-A project anticipates the use of peak data rates of 0.5 Gbps in the uplink (UL) direction and 1 Gbps in the downlink (DL) direction. In order to achieve these data rates, UL multiple input/multiple output (MIMO) is being considered for the LTE-A project.

FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected with each other by means of an X2 interface 108. The eNBs 102 are also connected by means of an S1 interface 106 to the Evolved Packet Core (EPC) 104 that includes a Mobility Management Entity (MME) 108 and a Serving Gateway (S-GW) 110.

FIG. 2 shows an LTE user-plane protocol stack 200 in accordance with the prior art. The protocol stack 200 is located in a WTRU 210 and includes the packet data control protocol (PDCP) 202, the radio link control (RLC) 204, the medium access control (MAC) 206 and the physical layer (PHY) 208. The protocol stack 200 may also reside in an eNB (not shown).

FIG. 3 shows an LTE control plane protocol stack 300 of the WTRU 210 of FIG. 2. The control plane protocol stack 300 includes the non-access stratum (NAS) 302 and a radio resource control (RRC) 304. Also included are the PDCP 306, RLC 308 and MAC 310, which together form the layer 2 sublayer 312.

Logical channel prioritization is a procedure that is performed for each new transmission by a transmitting entity. The transmitting RRC entity controls the scheduling of UL data by giving each logical channel a priority. A higher priority value indicates a lower actual priority level. Additionally, each logical channel is given a prioritized bit rate (PBR).

The RRC of a wireless transmit receive unit (WTRU) may perform the logical channel prioritization procedure. FIG. 4 shows a logical channel prioritization method 400 in accordance with the prior art. At step 402 the WTRU allocates resources to the logical channels. The WTRU, at step 404 allocates resources to the logical channels in a decreasing priority order up to a value such that on average, the served data rate for radio bearers that have data for transmission equals the configured PBR for the radio bearer. If the PBR of a radio bearer is set to "infinity", the WTRU allocates resources for all the data that is available for transmission on the radio bearer before meeting the PBR of the lower priority radio bearers. At step 406 the WTRU, if any resources remain, serve all the logical channels in a strict decreasing priority order until either the data for that logical channel or the UL grant is exhausted, whichever comes first.

For the method 400 shown in FIG. 4, the WTRU may follow certain rules. For example, the WTRU should not segment a radio link control (RLC) service data unit (SDU), or partially transmitted SDU or retransmitted RLC protocol data unit (PDU), if the whole SDU, partially transmitted SDU or retransmitted RLC PDU fits into the remaining resources. Further, if the WTRU segments an RLC SDU from the logical channel, it may maximize the size of the segment to fill the grant as much as possible. Also, the WTRU may use as much data as it can to fill the grant, in general. However, if the remaining resources require the WTRU to segment an RLC SDU with size smaller than a certain number of bytes or smaller than the L2 header size, the WTRU may use padding to fill the remaining resources instead of segmenting the RLC SDU and sending the segment.

Logical channels configured with the same priority are served equally by the WTRU. Medium access control (MAC) control elements for buffer status reporting, with exception of padding BSR, have higher priority than user plane logical channels. At a serving cell change, the first UL dedicated control channel (DCCH) MAC SDU to be transmitted in the new cell has higher priority than MAC control elements for BSR.

With the introduction of UL MIMO in LTE-advanced, enhanced MAC logical channel prioritization and multiplexing mechanisms may be needed to handle multiple transport blocks (TBs) within the same transmission time interval (TTI).

SUMMARY

A method and apparatus for logical channel prioritization in a wireless transmit receive unit (WTRU) is disclosed. This may include the WTRU receiving multiple streams of a multiple input/multiple output (MIMO) signal. This may also include a physical layer (PHY) of the WTRU providing an indicator for each of the multiple streams to a medium access control (MAC) layer of the WTRU and the MAC layer performing logical channel multiplexing based on the indicator for each of the multiple streams.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
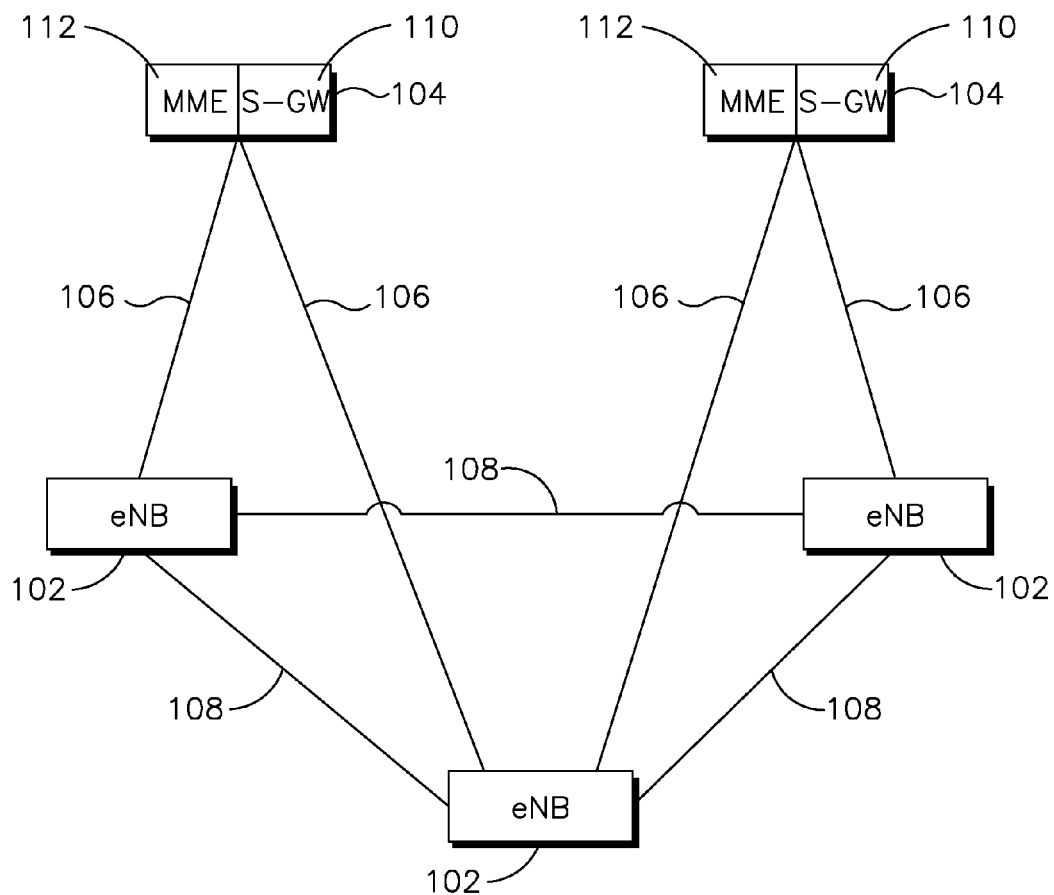
FIG. 1 shows an overview of an Evolved Universal Mobile Telecommunications System (UMTS) Terrestrial Radio Access Network (E-UTRAN) in accordance with the prior art.
Figure 2:
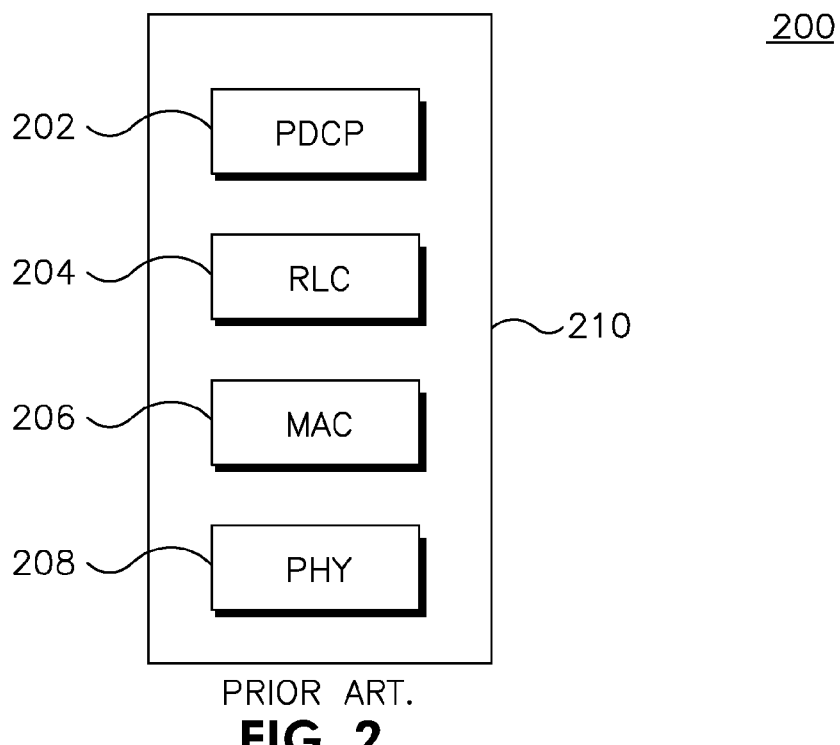
FIG. 2 shows an LTE user-plane protocol stack in accordance with the prior art.
Figure 3:
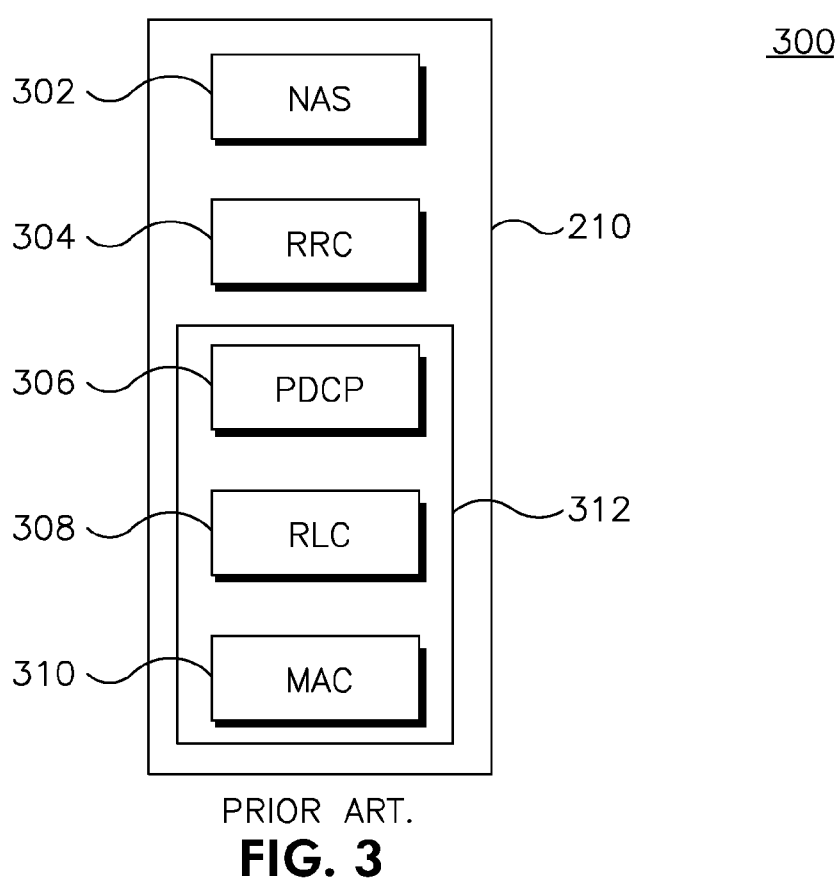
FIG. 3 shows an LTE control plane protocol stack of the WTRU 210 of FIG. 2.
Figure 4:
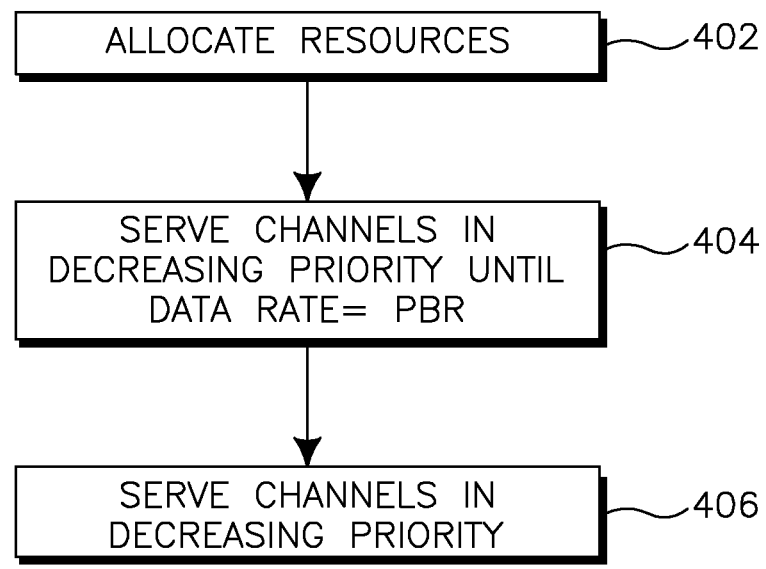
FIG. 4 shows a logical channel prioritization method 400 in accordance with the prior art.
Figure 5:
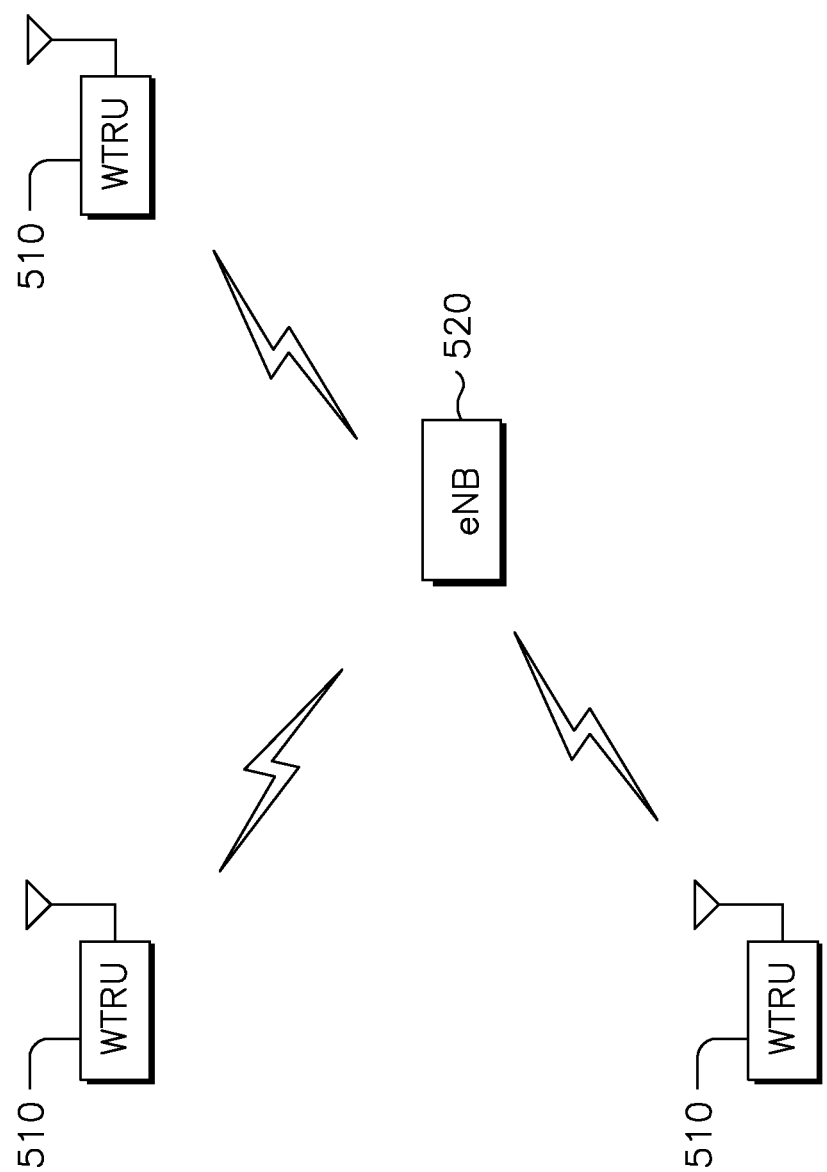
FIG. 5 shows a wireless communication system 200 including a plurality of WTRUs 210 and an e Node B (eNB) 220.

FIG. 5 shows a wireless communication system 500 including a plurality of WTRUs 510 and an e Node B (eNB) 520. As shown in FIG. 5, the WTRUs 510 are in communication with the eNB 520. Although three WTRUs 510 and one eNB 520 are shown in FIG. 5, it should be noted that any combination of wireless and wired devices may be included in the wireless communication system 500.

Figure 6:
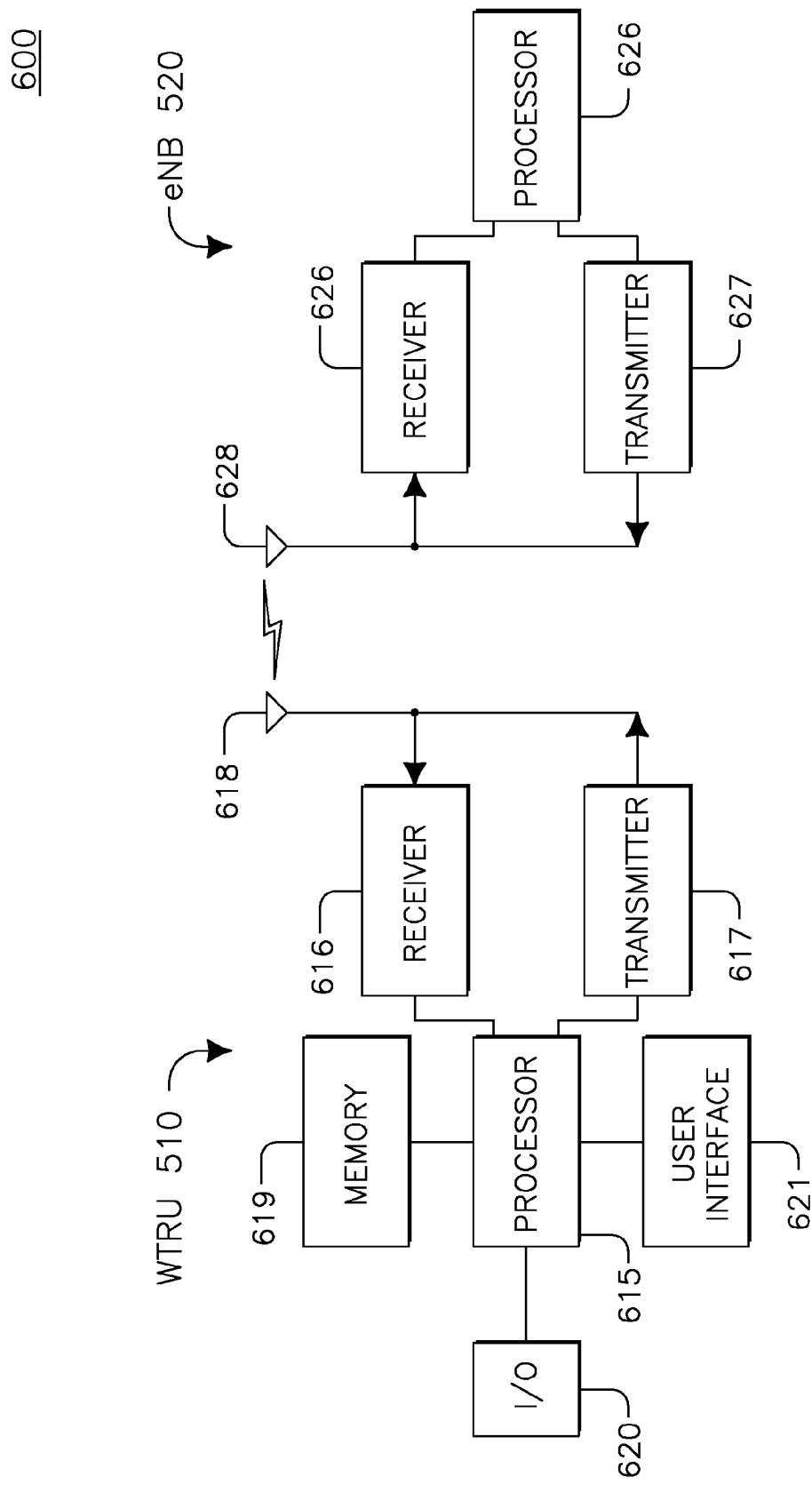
FIG. 6 is a functional block diagram of the WTRU and the eNB of the wireless communication system of FIG. 5.

FIG. 6 is a functional block diagram 600 of a WTRU 510 and the eNB 520 of the wireless communication system 500 of FIG. 5. As shown in FIG. 5, the WTRU 510 is in communication with the eNB 520. The WTRU 510 is configured with a PHY layer, MAC layer, RRC layer and an RLC layer. The WTRU 510 is further configured to perform logical channel prioritization as required.

In addition to the components that may be found in a typical WTRU, the WTRU 510 includes a processor 615, a receiver 616, a transmitter 617, and an antenna 618. The WTRU 510 may also include a user interface 618, which may include, but is not limited to, an LCD or LED screen, a touch screen, a keyboard, a stylus, or any other typical input/output device. The WTRU 510 may also include memory 619, both volatile and non-volatile as well as interfaces 620 to other WTRU's, such as USB ports, serial ports and the like. The receiver 616 and the transmitter 617 are in communication with the processor 615. The antenna 618 is in communication with both the receiver 616 and the transmitter 617 to facilitate the transmission and reception of wireless data.

In addition to the components that may be found in a typical eNB, the eNB 520 includes a processor 625, a receiver 626, a transmitter 627, and an antenna 628. The receiver 626 and the transmitter 627 are in communication with the processor 625. The antenna 628 is in communication with both the receiver 626 and the transmitter 627 to facilitate the transmission and reception of wireless data. The eNB 520 is configured with a PHY layer, a MAC layer and an RRC layer. The eNB 520 is further configured to perform logical channel prioritization upon transmission as required.

The PHY layer within a transmitting entity, for example, a WTRU or an eNB, may provide certain indications to the MAC layer with the transmitting entity. For example, the PHY may indicate to the MAC, for each MIMO stream, channel conditions and/or information on physical allocation so that the modulation and coding scheme (MCS), transmit power, and TB size can be determined for each MIMO stream.

The transmit power and TB size may depend on the MCS and on the particular MAC data flow or combination of data flows assigned to each MIMO stream. For a selected MAC data flow or combination of flows, the choice of MCS, transmit power, and TB size may be dependent on the channel quality of the MIMO stream and channel allocation information of the MIMO stream. The MAC may choose these parameters so that the Quality of Service (QoS) is normalized on each MIMO stream. An intended result is for the residual hybrid retransmission request (HARQ) process error rate to be similar on each MIMO stream when the same data flow or flows are assigned.

The PHY may also indicate to the MAC a ranking of the different TBs, for example, from the most preferred to the least preferred. The ranking may be based on the quality of the TB or underlying MIMO stream. For example, a higher quality TB may be ranked ahead of a lower quality TB. The ranking may also be based on a size of the TB, the MCS, one or more of the link adaptation parameters such as power and/or MCS, the likelihood for correct reception, and/or HARQ acknowledge/non-acknowledge (ACK/NACK) results and statistics. The PHY may indicate the TBs in sequence to the MAC, for example, from the most preferred to the least preferred. Alternatively, PHY can indicate a pointer to a predetermined TB set rather than send a list.

The MAC will may use the indications from the PHY layer to perform logical channel multiplexing on the TBs. Within the transmitting entity, when given multiple TB's within the same TTI, the MAC logical channel prioritization procedure may populate and/or multiplex traffic on a TB according to the MIMO stream quality and physical channel allocation information, or according to the ranking indicated from the PHY layer. For example, if a determination is made that the first TB to be populated is TB1 and that the second TB to be populated is TB2 and so on, the MAC will perform the operation. MAC multiplexing/logical channel prioritization on multiple TB's may be according to a certain order. The ranking or ordering criteria can be used to optimize and improve the performance of uplink transmissions in a way that can enhance the quality of service (QoS) and the uplink throughput.

A transmitting entity may receive, for each MIMO stream, an MCS for each of the multiple TBs, size for each of the multiple TBs, transmission power for each of the multiple TBs, UL radio resources, such as frequency and time or space location of radio resource blocks, for example, an UL preceding MIMO index such as a pre0-coding matrix index (PMI) or MIMO channel coefficients, for example, information regarding HARQ processes used for UL transmission and HARQ feedback (ACK/NACK) for each of the multiple TBs. The information may be received in an UL scheduling grant, for example, which is carried on an DL control channel, such as the physical downlink control channel (PDCCH), for example. For each MIMO stream, the information may be signaled explicitly or implicitly. If signaled implicitly, some information may be derived from other signaled parameters. For example, a TB size may be derived from the MCS and allocated resource blocks.

The order or location of the parameters in the control channel may indicate the order of the TB's to be populated by the MAC. For example, the first TB (TB1) may correspond to the first codeword and the second TB (TB2) may correspond to the second codeword, and so on. A MAC multiplexing function may populate TB1 first, then TB2 and so on, in accordance with the order implied from or indicated in the signaling channel. Accordingly, the ranking or ordering criteria of populating the TB's by the MAC multiplexing function corresponds to the order that will be implied/derived from the signaling.

When a transmitting entity, such as a WTRU, for example, is processing multiple TBs within the same TTI, the MAC logical channel prioritization procedure may populate or multiplex traffic on the TBs according to a particular order. The population may be performed in a round-robin fashion, for example. The order shifts or circulates in every defined time period, whether the time period is, for example, every TTI, or every TTI allocated. Alternatively, the population may be performed randomly or arbitrarily.

The MAC may perform a logical channel prioritization and multiplexing operation on each of the TB's in the TTI, independent of the other TBs. The MAC may perform logical channel (LC) prioritization and multiplexing, and create a MAC PDU for TB1, and perform the same procedure to create a MAC PDU for TB2.

This operation is equivalent to running the LC prioritization and multiplexing logic in one TTI, and rerunning the same logic for another TTI. However, the rerunning of the same logic occurs twice in the same TTI. The LC prioritization and multiplexing of different TBs to be transmitted in the same TTI can be operated simultaneously or sequentially.

The MAC evaluates the sizes of all TB's within the TTI, and performs prioritization and multiplexing of LC's on the TBs jointly. Rather than prioritizing logical channels on TB's according to the priority/order of the TBs, the WTRU may map data from different logical channels on any of the TB's in such a way that will minimize the overhead, such as the RLC segmentation overhead, for example. For example, the WTRU may maximize the size of the RLC PDU and minimize the need for segmentation.

If there is sufficient data, the transmitting MAC may multiplex a number of RLC PDUs. The number may be as close as possible to the number of TB's in a TTI. For example, if there are 2 TBs per TTI, 2 RLC data PDUs should be multiplexed, that is, one in each TB. This may prevent excessive segmentation and may maximize the RLC PDU sizes.

If the WTRU is scheduling 2 or more RLC SDUs, the WTRU may compare the size of each of the RLC SDU with the size of each of the TB's. For each of the SDUs, the WTRU multiplexes an RLC SDU on the TB that will not require segmentation of the RLC SDU and/or will lead to minimizing the occurrence of segmentation of the other RLC SDUs that will be multiplexed on the other TBs. The WTRU may not segment an RLC SDU if the whole SDU fits into any of the TBs in the TTI, or if it fits into any of the remaining un-assigned/un-populated TB's of the TTI. If the WTRU segments an RLC SDU from the logical channel, it maximizes the size of the segment to fill the TB as much as possible. If the WTRU has an option to perform segmentation or re-segmentation on at least one RLC SDU, the WTRU may select or segment the RLC PDU that will result in the lowest segmentation overhead. For example, if the WTRU has the option of segmenting an RLC SDU for the first time, or resegmenting an RLC PDU for the first time, then the WTRU may segment the former and retransmit the latter as is, rather than transmitting the former as is and resegmenting the latter, because the overhead due to resegmentation is typically higher.

In another embodiment, the WTRU may select the permutation or mapping that minimizes the occurrence of segmentation and/or resegmentation. For example, assume that the WTRU is scheduling data (Di) from an LC's (LCi) and has 2 TBs of size TBS1 and TBS2. The WTRU may consider the sizes TBS1 and TBS2 in order to find the permutation or mapping that minimizes the occurrence of segmentation on all Di. The WTRU may view this in terms of a bin-packing problem, whereby the TBs are the bins, and the MAC SDUs and/or MAC CE's are the objects to be packed in the two bins of sizes TBS1 and TBS2, with the exceptions that the size of one or more of the objects to be packed can be changed and the process is constrained by the goal of minimization of total segmentation overhead and/or padding.

Alternatively the MAC may choose data flows to be multiplexed into TBs based on the quality and/or resource allocation of each MIMO channel. The MAC may chose the data flow or combination of data flows to multiplex for each TB mapped to a MIMO stream based on the data flow quality and/or data rate requirements.

MAC control elements CEs may be transmitted on any of the TBs. However, in order to improve the reception of MAC CEs, the WTRU can transmit then on the TB with the highest quality. The MAC CEs may be handled as the highest priority traffic by the MAC multiplexing logic. However, the MAC CEs may also be distributed among the TBs in such a way that will minimize the occurrence of segmentation for the other MAC PDUs.

In another alternative embodiment, an information element (IE) sent over RRC signaling can include configuration information regarding a mapping of LCs onto TBs. The WTRU may restrict or allow a group of LCs to be multiplexed on a given TB, while allowing another group of LCs to be multiplexed on another TB.

For example, RRC signaling may specify which LCs should be mapped to the first TB, and which LCs should be mapped to the second TB. The first and second TB can be determined by the WTRU. For example, the first TB may be a preferred TB because it is, for example, a high quality TB, and not necessarily the first one available. The WTRU may perform logical channel multiplexing in accordance with the mapping, and if any resources remain, and no more data is available from one of the LC groups, then it may include/multiplex data from the other group onto the TB configured for the other LC group.

By way of example, a WTRU may receive a signal that a first LC group, including, for example, LC1, LC3, and LC4, are to be multiplexed on the first TB, while a second LC group, including, for example, LC2 and LC5 are to be multiplexed on the second TB. The WTRU will multiplex the traffic on the TBs in a way that adheres to the signaled mapping. As an optional optimization, if the WTRU does not have sufficient data to transmit from one LC group, then data from the other group may be sent on the other TB. Some LCs may be present in more than one group. As another alternative, L2 signaling can be used to configure the mapping or grouping of LC's onto TBs.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of logical channel prioritization in a wireless transmit receive unit (WTRU), the method comprising:
   receiving multiple streams of a multiple input/multiple output (MIMO) signal;
   a physical layer (PHY) of the WTRU providing an indicator for each of the multiple streams to a medium access control (MAC) layer of the WTRU, and the PHY layer assigning a preference level to each of a plurality of transport blocks, compiling a list of the plurality of transport blocks based on the preference level, and sending the list to the MAC layer; and
   the MAC layer performing logical channel multiplexing of data included in the multiple streams based on the indicator for each of the multiple streams.

2. The method as in claim 1 further comprising the PHY layer forwarding, for each of the multiple streams, channel condition information to the MAC layer.

3. The method as in claim 2 further comprising the MAC layer determining a modulation and coding scheme (MCS), transmit power and transport block (TB) size for each of the multiple streams.

4. The method as in claim 3 further comprising the MAC layer determining the MCS, transmit power and TB size for each of the multiple streams based on the MAC layer normalizing a quality of service (QoS) for each of the multiple streams.

5. The method as in claim 1 further comprising the MAC layer determining a quality level for each of the multiple streams of the MIMO signal and performing logical channel multiplexing of the data included in the multiple streams, further based the quality level and physical channel allocation information.

6. The method as in claim 1 further comprising the WTRU receiving a list of parameters in a data channel and the MAC layer performing logical channel multiplexing of the data included in the multiple streams, further based on an order of the parameters in the data channel.

7. The method as in claim 1 further comprising the WTRU receiving a list of parameters in a data channel and the MAC layer performing logical channel multiplexing of the data included in the multiple streams, further based on a round-robin method.

8. The method as in claim 1 further comprising the WTRU receiving a list of parameters in a data channel and the MAC layer arbitrarily performing logical channel multiplexing of the data included in the multiple streams.

9. The method as in claim 1 wherein the multiple streams comprise multiple transport blocks in multiple time transmission intervals, and further comprising the MAC layer performing the logical channel prioritization process on each of the multiple transport blocks in each of the multiple transmission time intervals.

10. The method as in claim 1 wherein the multiple streams comprise multiple transport blocks in multiple time transmission intervals, and further comprising the MAC layer performing the logical channel prioritization process on all of the multiple transport blocks in each of the multiple transmission time intervals.

11. The method as in claim 10 further comprising the WTRU mapping data from logical channels onto a transport block based on a minimization of overhead process.

12. A wireless transmit receive unit (WTRU) configured to perform logical channel prioritization, the WTRU comprising:
   a receiver configured to receive multiple streams of a multiple input/multiple output (MIMO) signal; and
   a processor configured such that:
      a physical layer (PHY) provides an indicator for each of the multiple streams to a medium access control (MAC) layer of the WTRU, and the PHY layer assigns a preference level to each of a plurality of transport blocks, compiles a list of the plurality of transport blocks based on the preference level, and sends the list to the MAC layer; and
      the MAC layer performs logical channel multiplexing of data included in the multiple streams based on the indicator for each of the multiple streams.

13. The WTRU as in claim 12 wherein the processor is further configured such that the PHY layer forwards, for each of the multiple streams, channel condition information to the MAC layer.

14. The WTRU as in claim 13 wherein the processor is further configured such that the MAC layer determines a modulation and coding scheme (MCS), transmit power and transport block (TB) size for each of the multiple streams.

15. The WTRU as in claim 14 wherein the processor is further configured such that the MAC layer determines the MCS, transmit power and TB size for each of the multiple streams based on the MAC layer normalizing a quality of service (QoS) for each of the multiple streams.

16. The WTRU as in claim 12 wherein the processor is further configured such that the MAC layer determines a quality level for each of the multiple streams of the MIMO signal and perform logical channel multiplexing of the data included in the multiple streams, further based the quality level and physical channel allocation information.

17. The WTRU as in claim 12 further comprising a receiver configured to receive a list of parameters in a data channel and wherein the processor is further configured to perform logical channel multiplexing of the data included in the multiple streams, further based on an order of the parameters in the data channel.

18. The WTRU as in claim 12 further comprising a receiver configured to receive a list of parameters in a data channel and wherein the processor is further configured to perform logical channel multiplexing of the data included in the multiple streams, further based on a round-robin method.

19. The WTRU as in claim 12 further comprising a receiver configured to receive a list of parameters in a data channel and wherein the processor is further configured to arbitrarily performing logical channel multiplexing of the data included in the multiple streams.

20. The WTRU as in claim 12 wherein the multiple streams comprise multiple transport blocks in multiple time transmission intervals, and wherein the processor is further configured such that the MAC layer performs the logical channel prioritization process on each of the multiple transport blocks in each of the multiple transmission time intervals.

21. The WTRU as in claim 12 wherein the multiple streams comprise multiple transport blocks in multiple time transmission intervals, and the processor is further configured such that the MAC layer performs the logical channel prioritization process on all of the multiple transport blocks in each of the multiple transmission time intervals.

22. The WTRU as in claim 12 wherein the processor is further configured to map data from logical channels onto a transport block based on a minimization of overhead process.

* * * * *